United States Patent [19]

Bastenhof

[11] Patent Number: 5,047,146
[45] Date of Patent: Sep. 10, 1991

[54] BIDIRECTIONAL FLOW VACUUM FILTER FOR A SWIMMING POOL HAVING INFLUENT AND EFFLUENT CONDUITS AS STRUCTURAL MEMBERS

[75] Inventor: Dirk Bastenhof, Veenendaal, Netherlands

[73] Assignee: Aquatic Amusement Associates, Ltd., Cohoes, N.Y.

[21] Appl. No.: 484,559

[22] Filed: Feb. 23, 1990

[51] Int. Cl.⁵ .................. B01D 35/02; E04H 4/12
[52] U.S. Cl. ........................ 210/97; 138/148; 210/169; 210/248; 210/291; 210/456
[58] Field of Search ............ 52/169.7, 169.8; 210/104, 105, 123, 129, 169, 275, 248, 277, 279, 287, 289, 291, 456, 97, 110, 284; 138/172, 148; 4/508

[56] References Cited

U.S. PATENT DOCUMENTS

| | | | |
|---|---|---|---|
| 2,391,716 | 12/1945 | Koupal | 210/275 |
| 3,184,111 | 5/1965 | Watson et al. | 210/169 |
| 3,587,861 | 6/1971 | Ross | 210/277 |
| 3,814,247 | 6/1974 | Hirs | 210/279 |
| 3,969,248 | 7/1976 | Whitmer | 210/169 |
| 4,127,485 | 11/1978 | Baker et al. | 210/169 |
| 4,400,273 | 8/1983 | Bastenhof | 210/284 |
| 4,627,118 | 12/1986 | Baker | 4/508 |
| 4,706,309 | 11/1987 | van den Broek | 4/508 |

OTHER PUBLICATIONS

Biwater Filtration Limited "Biflow Edoch Filter".
Paddock Pool Equipment Co., Inc., "VSC Vacu-Flo Vacuum Sand Filter", 2/88.

Primary Examiner—Robert A. Dawson
Assistant Examiner—Joseph Drodge
Attorney, Agent, or Firm—Heslin & Rothenberg

[57] ABSTRACT

A swimming pool bi-flow filter has been described herein. The invention includes the following integral structural components: an influent conduit, an effluent conduit, an influent trough and a plurality of influent and effluent laterals. Ports in the influent conduit and the influent trough receive water from a source, such as swimming pool. The water entering the influent conduit flows upwards through the influent laterals to the effluent laterals, while the water entering the influent trough overflows into the filter and flows downwards to the effluent laterals. The water then passes through the effluent laterals and into the effluent conduit. As previously mentioned, the conduits, trough and laterals are an integral part of the structure, which necessarily means that thinner materials may be used in constructing the filter, without the loss of strength or durability.

10 Claims, 7 Drawing Sheets

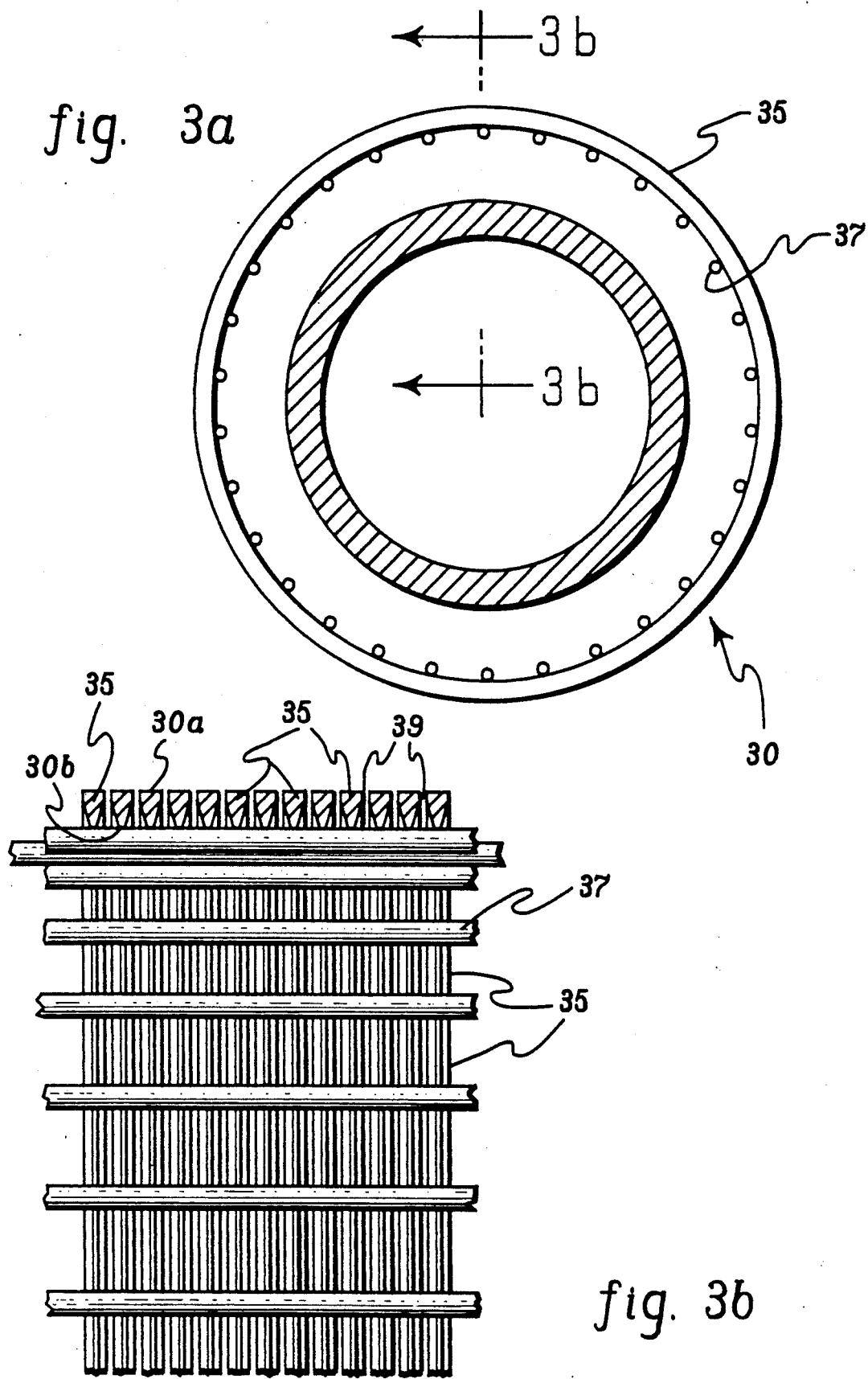

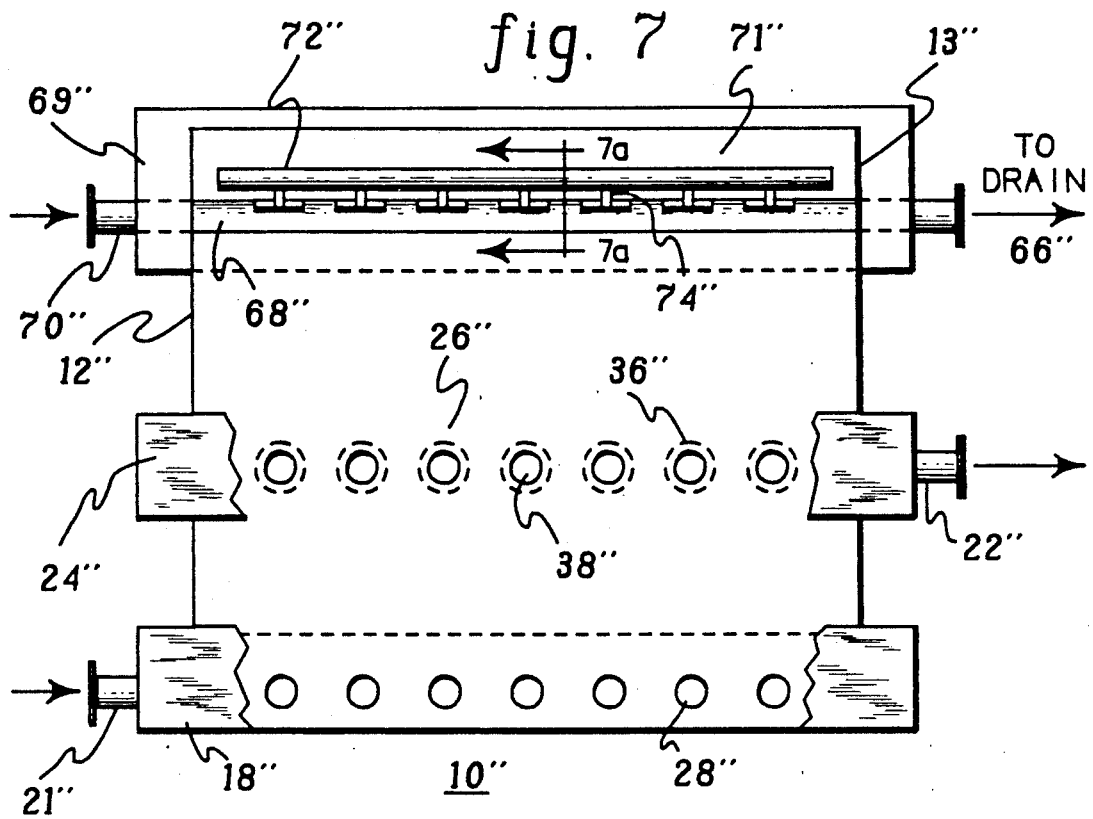
fig. 7
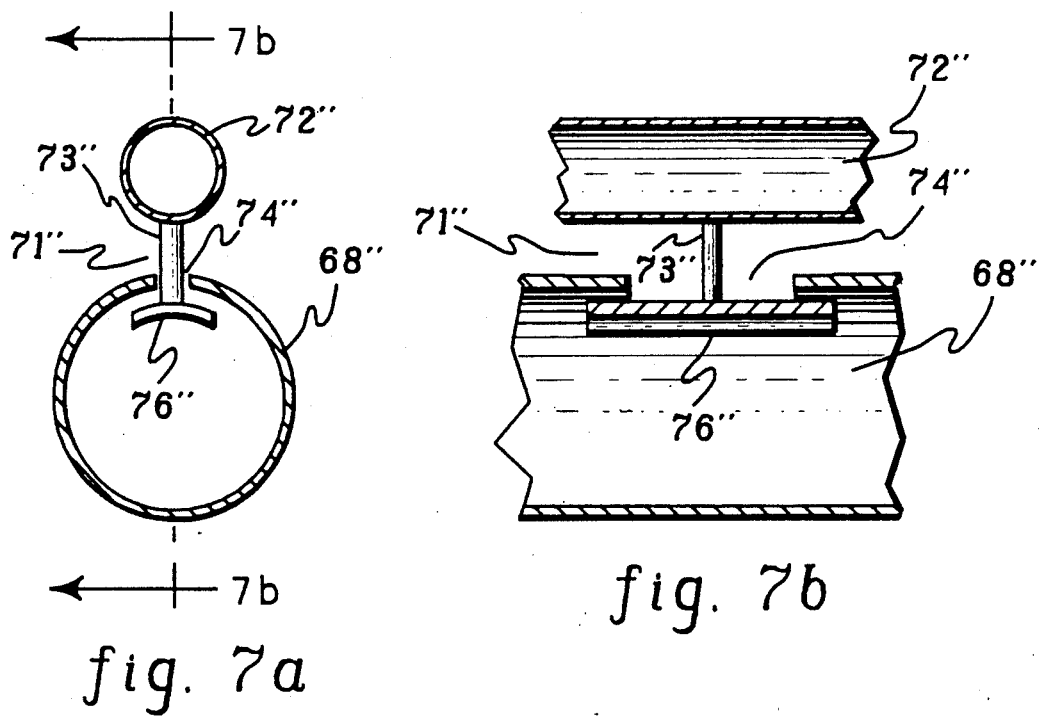
fig. 7a
fig. 7b

BIDIRECTIONAL FLOW VACUUM FILTER FOR A SWIMMING POOL HAVING INFLUENT AND EFFLUENT CONDUITS AS STRUCTURAL MEMBERS

BACKGROUND OF THE INVENTION

1. Technical Field

The present invention relates to filters, and, more particularly, to a bi-flow filter which can be used in purifying water for swimming pools and other applications.

2. Description of Prior Art

Conventional filters used in the purification of swimming pool water have several shortcomings. For instance, they characteristically contain structures inside their main cavities which disrupt the water flow during filtration. These obstructions cause "dead spots" to form within the filter during operation. "Dead spots" are places within the filter on the downstream side of a flow obstruction where no filtering action takes place, thus decreasing filter efficiency and requiring a proportionately larger filter to handle a given filtering job. Besides detracting from filter efficiency, internal obstructions and their associated dead spots also provide places where bacteria are likely to grow.

A further shortcoming is that existing filters require the use of expensive heavy gauge materials for construction of the filter's walls and other necessary parts. Another shortcoming is that there is no way to visually or physically inspect the filter media during the backwash operation.

Still another shortcoming is that present control systems used with these existing filters are fairly complicated and require the operation of several valves in cycling from normal filtering operation to backwash operation and vice versa.

In light of the above shortcomings of existing swimming pool filters, a need exists for a swimming pool filter which is free from flow obstructions during filtration and has a minimum of obstructions during backwash. A need also exists for a filter which is inherently structurally strong, easier and more economical to construct. A further need exists for a filter which will permit the use of a relatively simple control system for cycling the filter operation between normal filtering operation and backwash operation.

SUMMARY OF THE INVENTION

Accordingly, a principle object of the present invention is to provide a swimming pool filter with bi-flow cleaning action.

It is a further object of this invention to provide a filter structure which is more economical and easier to construct than existing filter structures.

It is still a further object of this invention to construct a filter having no flow obstructions during filtration and a minimum of flow obstructions during backwash.

Another object of this invention is to provide a filter which has uniform distribution of water during filtering or backwash operations.

It is a further object of this invention to provide a filter which is more energy efficient than existing filters.

Another object of the present invention is to provide a filter which permits visual and physical inspection of the filter media during backwash operation.

It is a still further object of the present invention to provide a filter which is usable in different types of installations, such as below the deck or above the deck installations.

Yet another object of the present invention is to provide a filter for use with relatively simple filter control systems for cycling operation between normal filtering operation and backwash operation.

Components of one embodiment of the present invention include a watertight enclosure having a bottom and upstanding walls, influent laterals, an influent conduit, effluent laterals, an effluent conduit, an influent trough and filtering media. The influent laterals are arranged in a parallel relationship with one another on a first plane near the bottom of the enclosure and their ends are in communication with the interior of the influent conduit. This conduit is an integral structural support surrounding the outside of the walls of the enclosure. Influent water travels through the influent conduit and passes through the influent laterals.

The effluent laterals are also arranged in a parallel relationship with one another on a second plane above the first plane and their ends are in communication with the interior of the effluent conduit. The effluent conduit is also an integral structural support surrounding the outside of the enclosure's walls and it enables filtered water to be discharged from the filter.

The influent trough is on a third plane above the second plane, and it is a further integral structural support surrounding the outside of the walls of the enclosure.

Viewed in another aspect of the present invention, the components include a watertight enclosure having a bottom and upstanding walls, a lower influent means, effluent means, an upper influent means, means operatively connected to the upper influent means for terminating the flow of fluid through the upper influent means when the fluid rises to a predetermined level above the filter media, and a discharge trough. The walls are divided into two segments in which the first segment terminates with an upper edge at a first level and a second segment terminates with an upper edge at a second level which is below the first level. Along the outside of the first segment, a discharge trough is mounted so that fluid can spill over the wall and into the trough. Along the outside of the second segment, an influent trough is mounted so that water can spill from the trough over the wall and into the filter.

The structures, as described above, are inherently strong, and therefore eliminate the need for the use of expensive heavy gauge materials. Also, the structures are constructed so that all of the conduits and troughs are on the outside of the enclosure, thereby eliminating interior obstructions to water flow during filtration. By removing these obstructions, dead spots and areas supportive of bacteria growth are eliminated.

BRIEF DESCRIPTION OF THE DRAWINGS

The subject matter which is regarded as the invention is particularly pointed out and distinctly claimed in the concluding portion of the specification. The invention, however, as to structure, together with further objects and advantages thereof, may best be understood by reference to the following description taken in conjunction with the accompanying drawings in which:

FIG. 3a is a cross-sectional view taken on line 3a—3a of FIG. 3;

FIG. 3b is a cross-sectional view taken on line 3b—3b of FIG. 3a;

FIG. 7 is a schematic diagram of an alternate embodiment of a filter for use with a relatively simple control system for cycling the operation of the filter between normal filtering operation and backwashing.

FIG. 7a is a cross-sectional view of a valve shown in FIG. 7 taken on line 7a—7a;

FIG. 7b is a cross-sectional view taken on line 7b—7b of FIG. 7a.

DETAILED DESCRIPTION OF THE INVENTION

Figure 1:
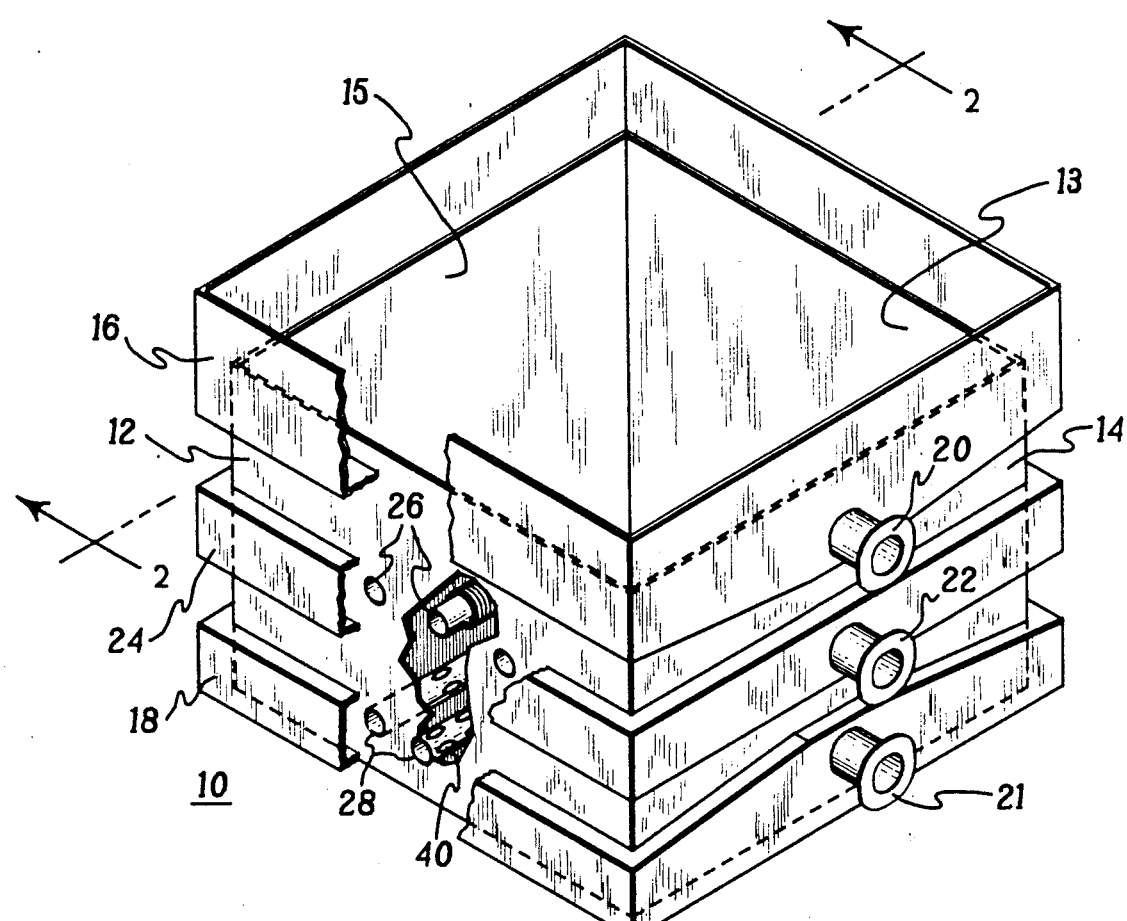
FIG. 1 is a perspective view with parts broken away of the bi-flow filter of this invention for general use; filter media has been omitted for clarity in this view.

A preferred embodiment of the invention for general swimming pool use is depicted in FIG. 1. In FIG. 1 it may be seen that a bi-flow filter 10 of this invention is in the overall shape of a right angle parallelepiped having a front wall 12 and a side wall 14 with corresponding parallel walls 13 and 15 on the respective opposite sides of the filter. The top of filter 10 may be uncovered or it may contain a cover with a vent open to the atmosphere (not shown). An influent trough 16 having a port 20 and an influent conduit 18 having a port 21 surround filter 10 near its top and bottom, respectively. An effluent conduit 24 having a port 22 surrounds filter 10 at its midsection. It should be noted that each conduit or trough may have more than one port.

Figure 2:
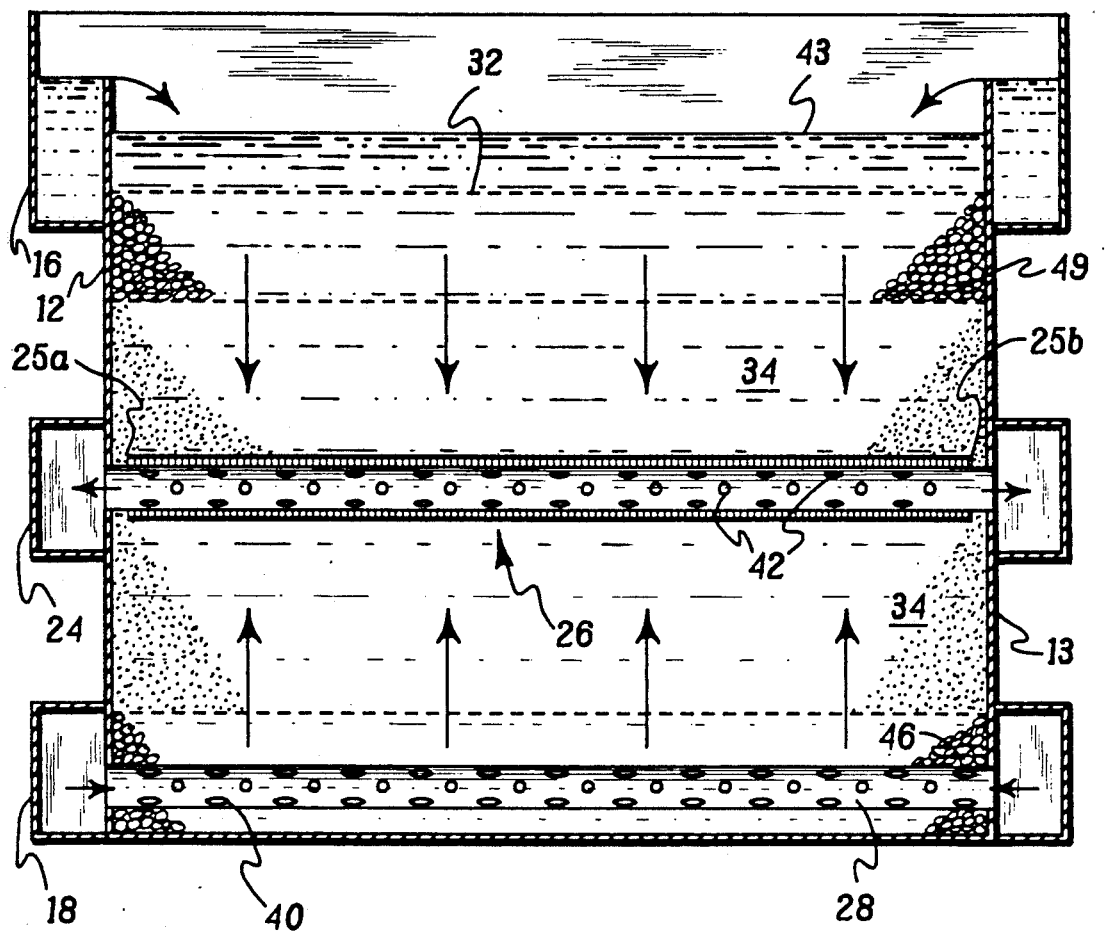
FIG. 2 is a cross-sectional view, including filter media, taken on line 2—2 of FIG. 1; this view schematically shows normal filtering operation of the filter.

Influent conduit 18 and effluent conduit 24 are manufactured from a metal such as a relatively thin stainless steel and, as illustrated in FIG. 2, each has a U-shaped cross-section. Although the U-shaped cross-section depicted in FIG. 2 is rectangular, "U-shaped", as used herein, is meant to denote any geometric form which will serve the structural and hydraulic purposes and functions intended for conduits 18 and 24 as hereinafter described. Conduits 18 and 24 are mounted usually by welding to the outside walls of filter 10. Influent trough 16 is made from the same material as influent conduit 18 and effluent conduit 24, but it has an L-shaped cross-section in which one leg is mounted to the outside walls of filter 10 and the other leg extends above the walls. This mounting is typically accomplished by welding. Again, it is not critical that an L-shaped trough be used. Other shapes can be used so long as they serve the structural and hydraulic purposes and functions intended for trough 16 as hereinafter described.

By mounting the conduits and trough in the above-described manner, conduits 18 and 24 and trough 16 not only provide the function of transporting water but also provide inherent structural strength allowing a relatively thin stainless steel to be used for the walls 12, 13, 14 and 15. For example, a filter measuring about 6 feet wide by 8 feet long and 6 feet high may have walls 12, 13, 14 and 15 constructed from 16 gauge stainless steel. The conduits 18 and 24 and the trough 16 may also be made of 16 gauge stainless steel. It should be noted that the walls of present-day rectangular filters must typically be made of stronger materials, thus making the use of stainless steel prohibitively expensive.

Figure 3:
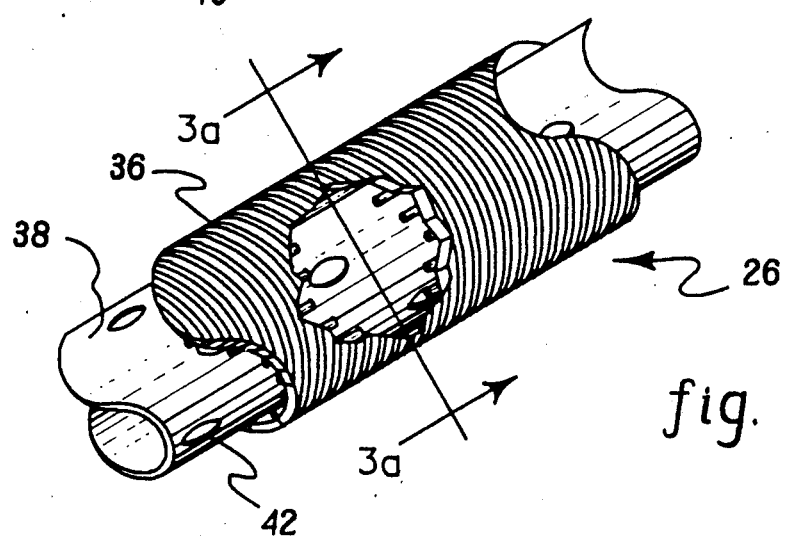
FIG. 3 is a fragmentary perspective view with parts broken away of a typical effluent lateral of FIGS. 1 and 2.

As shown in FIGS. 1 and 2, effluent laterals 26 are arranged in parallel through the midlevel of filter 10. One end of each lateral is mounted in wall 12 while its other end is similarly mounted in an opposing wall 13, as shown in FIG. 2. The mounting just mentioned is water tight and usually welded. As depicted in FIGS. 2 and 3, each effluent lateral 26 is comprised of a perforated inner pipe 38 surrounded by a sleeve of well wire 36. Well wire 36 is sealed at its ends 25a and 25b to pipe 38. Well wire 36, as shown in FIGS. 3a and 3b, consists of a plurality of rings of individual metal bands 35 which are arranged in a spaced-apart and parallel relationship with one another. (Alternatively, a spiral of similar material could be used in place of individual metal bands 35). This spaced-apart and parallel relationship creates slots 39 sized to prevent the surrounding sand particles or other filter media from entering inner pipe 38 (see FIG. 3).

Bands 35 are secured by individual metal rods 37. Rods 37 are also arranged in a spaced-apart and parallel relationship with one another but they are welded in a transverse relationship to bands 35 giving those bands structural support. Bands 35, having an exterior surface 30a and an interior surface 30b, are tapered such that exterior surface 30a is wider than interior surface 30b. The purpose of tapering is to prevent the entrapment of any filter media particles which happen to enter through slots 39. That is, if a particle enters through the narrower exterior surface 30a, it will easily pass through wider interior surface 30b thereby preventing the entrapment of that particle. If this was not accomplished, trapped particles would necessarily lower filter efficiency.

Referring back to FIGS. 1 and 2, influent laterals 28 are comprised of perforated pipes which are mounted in a water tight fashion in front wall 12 and rear wall 13. As illustrated in those figures, it will be understood that water to be filtered passes through port 21 and influent conduit 18 and into laterals 28 where it will pass through perforations 40.

The inside of filter 10 is substantially filled with a suitable filter media 34, such as sand. (See FIG. 2) Filter media 34 may rest on one or more support layers 46 and be covered by one or more top layers 49. As shown in FIG. 2, there is a support layer 46, filter media 34 and a top layer 49. Those familiar with filter technology will realize that these are not the only layers which may be used. Support layer 46 is typically comprised of gravel, filter media 34 is typically comprised of sand and top layer 49 is comprised of a material which is coarser but lighter than sand, such as coal. Those familiar with filter technology and filter media will realize that gravel, sand and coal are not the only suitable materials which may be used.

As shown in FIGS. 1 and 2, during filtering operation, water to be purified enters upper influent port 20 and lower influent port 21 and travels through trough 16 and conduit 18, respectively. As shown in FIG. 2, when the water in trough 16 rises above the top edges of the walls of filter 10, it spills into the enclosure or central portion of the filter. Ideally, the rate of flow of influent water through upper influent port 20 should be sufficient to maintain a normal water level 43 several inches above a level 32 of top layer 49 in order to maintain a uniform distribution of water under a reasonable head of pressure for even filtering action through filter media 34 and into effluent laterals 26. The water to be purified entering lower influent port 21 passes through influent conduit 18 and into influent laterals 28 from which the water emerges through perforations 40 and passes through filter media 34 to effluent laterals 26. When the water reaches laterals 26, it flows through slots 39 in surrounding well wire 36 and perforations 42 and enters effluent pipe 38 (see FIGS. 3, 3a and 3b). The water travels through effluent pipe 38 and into conduit 24 (see FIGS. 2 and 3). The water then passes through port 22 and is routed to its intended place of use.

It will be appreciated by those skilled in the art that the flow rates and pressures of the water entering ports 20 and 21 must be adjusted so that approximately the same volume passes through each during normal equilibrium operation of the filter.

Figure 4:
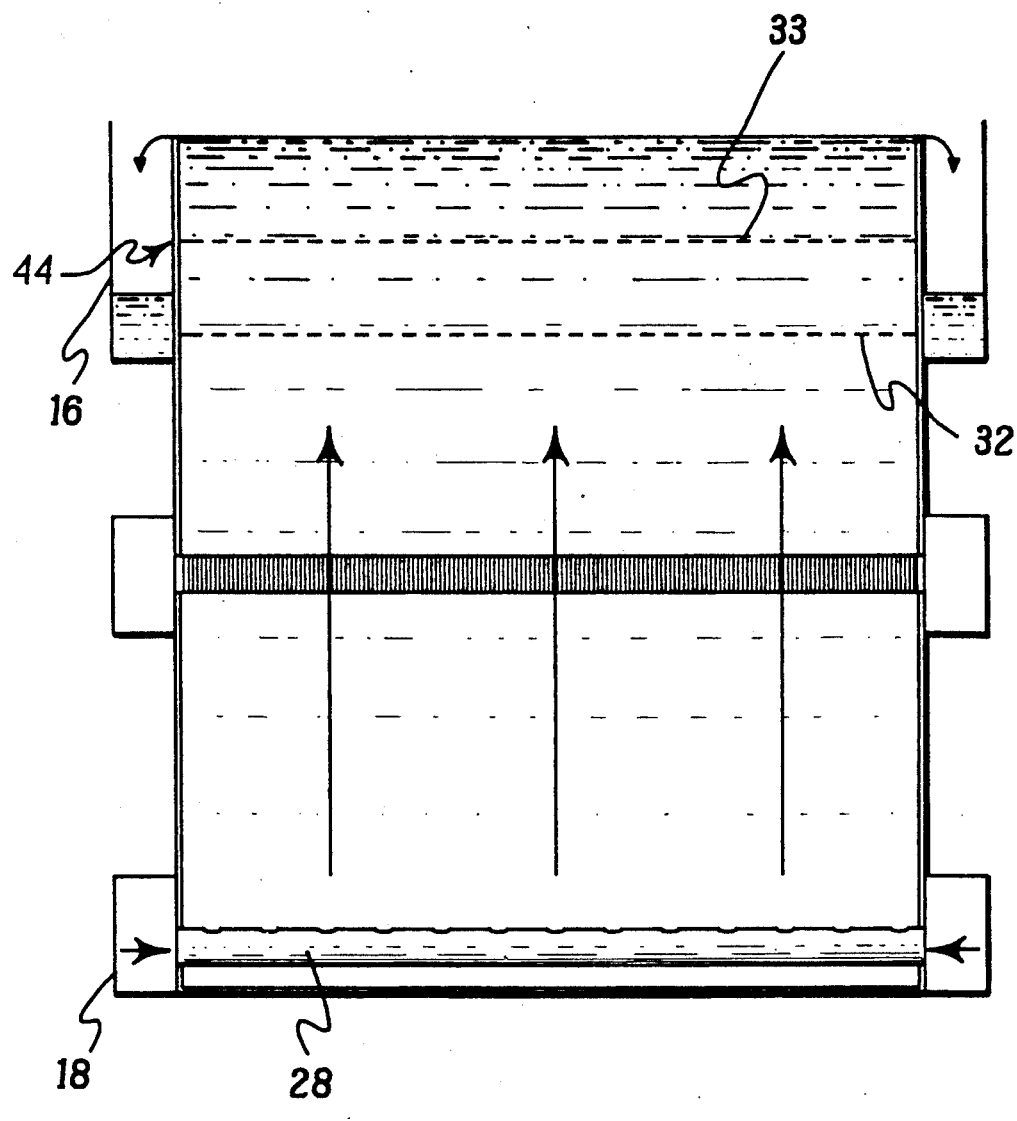
FIG. 4 is a schematic diagram showing the backwash operation of the filter of FIGS. 1 and 2.

By referring to FIGS. 1 and 4, backwash operations will now be described. By the use of standard commercially available valving and associated control systems (not shown) during backwash operations, effluent port 22 is closed thereby terminating the discharge of water therefrom and upper influent port 20 is disconnected from the flow of influent water to filter 10 but is reconnected to a drain (not shown). Thus, during backwash operation, water enters only through port 21 into conduit 18. It travels through conduit 18 and enters influent laterals 28. The water then passes through perforations 40 and, as depicted in FIG. 4, is forced upwards causing an expansion of filter media 34 thus raising the level of top layer 49 from level 32 to a new level 33. The water will continue to flow upwards until it flows over walls 12, 13, 14 and 15 of filter 10 and into trough 16. The water then travels through trough 16 until it reaches port 20 where it is discharged to a drain.

Figure 5:
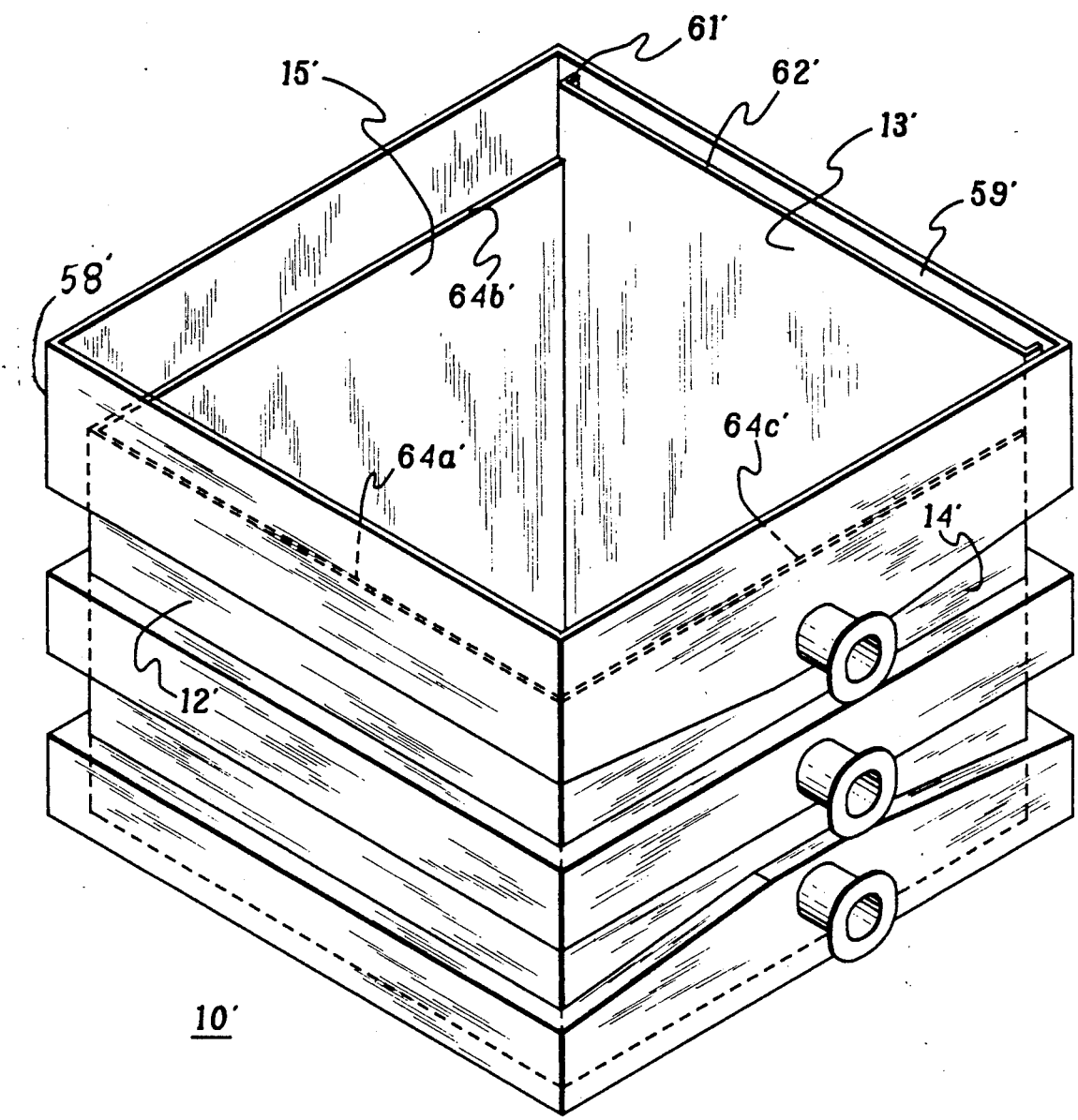
FIG. 5 is a perspective view of another embodiment of the bi-flow filter of the invention (without media) having an influent trough and a discharge trough.
Figure 6:
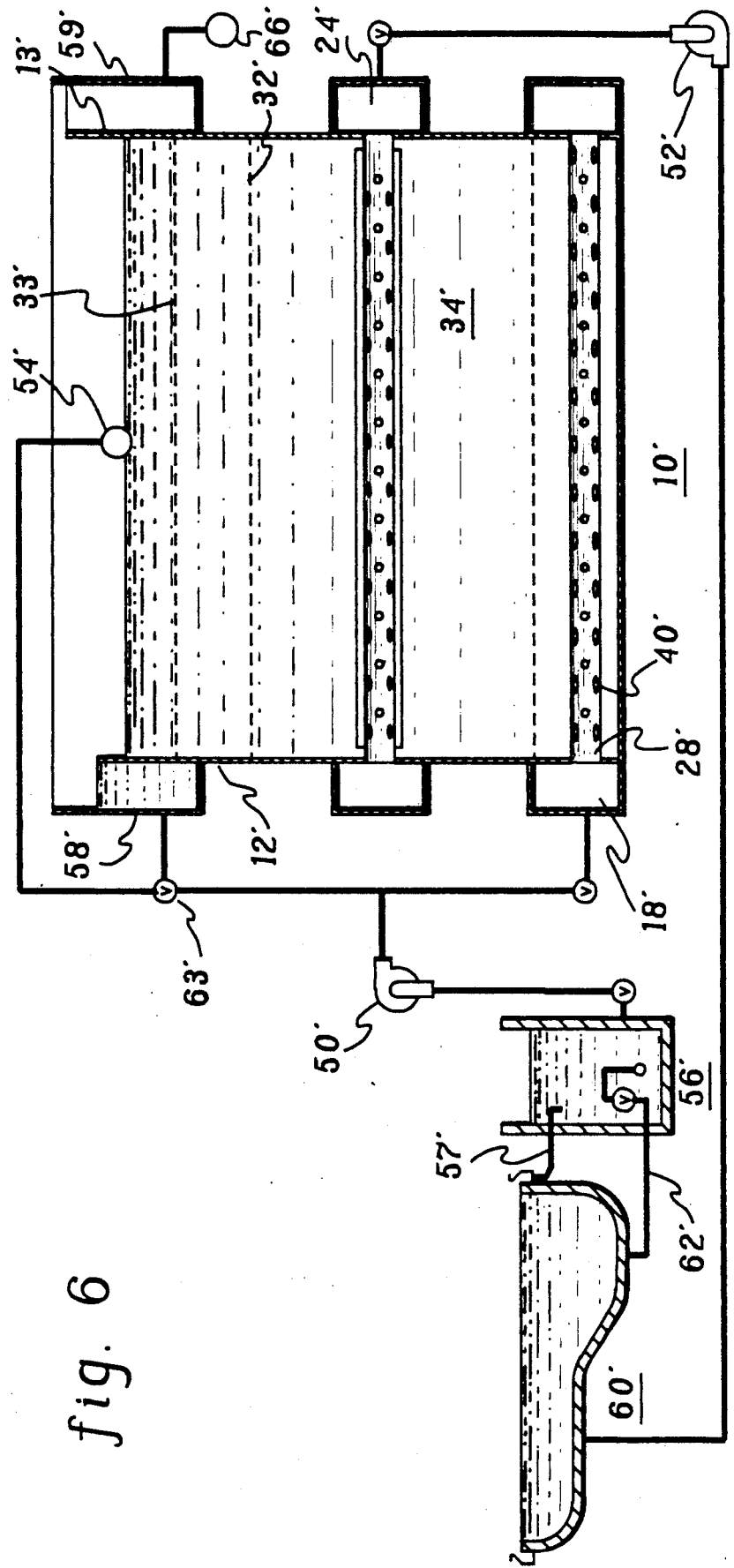
FIG. 6 is a partly schematic diagram showing the bi-flow filter of FIG. 5 in a typical installation during normal operation with a unique control system for cycling the operation of the filter between normal filtering operation and backwashing. In this figure the filter is enlarged for clarity.

Another embodiment of the present invention is depicted in FIGS. 5 and 6. The arrangement of the two pumps 50' and 52' in the hydraulic circuit of FIG. 6 allows a filter 10' to be located above or below the level of the pool. The configuration of the filter shown in FIGS. 5 and 6 permits the use of simplified control systems for cycling between normal and backwashing operations. As illustrated in FIG. 5, filter 10' is basically of a similar shape and structure as filter 10 of FIG. 1; however there are some differences. While filter 10' is also in the overall shape of a right angle parallelepiped having four walls, the walls of filter 10' are not of equal height. They are divided into two segments in which the first segment includes a wall 13' having an upper edge 62' and the second segment includes walls 12', 14' and 15' having upper edges 64a', 64b', and 64c', respectively. The upper edges of walls 12', 14', and 15' are all of equal height but the upper edge of wall 13' is higher. As a result of the walls being of different heights, two separate troughs are utilized. It is important to note that it is not critical that one segment includes three walls while the other segment includes one. Any combination of walls may be utilized as long as the result of creating two separate troughs is maintained. This separation is shown by reference number 61' in FIG. 5. At 61', it may be seen that discharge trough 59' is close-ended and has no communication with influent trough 58'. Influent trough 58', as illustrated in FIG. 6, is mounted, usually by welding, along the outside of the second segment so that influent fluid in trough 58' may spill during normal filtering operation over walls 12', 14' and 15' (see FIG. 5) into the enclosure of filter 10'. Discharge trough 59' is also mounted by welding along the outside of the first segment so that fluid from filter 10' may spill over wall 13' and into discharge trough 59' during backwash operation. The water is then released from trough 59' into a drain 66' (see FIG. 6).

As schematically illustrated in FIG. 6, filter 10' is connected between an influent pump 50' and a discharge pump 52' and includes a float valve 54'. Influent pump 50' is located on the left side of filter 10' and while one end is connected to filter 10', the other end is connected to a conventional balance tank 56'. There is a pipe 57' and a main drain 62' carrying water from swimming pool 60' to tank 56'. On the right side of filter 10' is discharge pump 52'. Discharge pump 52' is used to extract the effluent water from effluent conduit 24' and return it to pool 60'.

As previously mentioned, filter 10', as illustrated in FIG. 6, includes a float valve 54', which is operatively connected to a valve 63'. Valve 63' can be any of several devices which are well-known to those skilled in the art. Float valve 54' is used in maintaining the water level in filter 10' and is also used in providing automatic backwash operations. A backwash operation may be automatically accomplished by using a timed switch (not shown) to shut off pump 52'. When pump 52' shuts off, the water will stop flowing out of effluent conduit 24' but will continue to flow through influent conduit 18' and influent trough 58' until the water reaches a predetermined level. At that level valve 63' will shut off and close valve 54', thereby forcing the influent water to enter filter 10' solely through influent conduit 18' and influent laterals 28'. As previously described, when the water enters influent laterals 28', it passes through perforations 40' and is forced upwards causing filter media 34' to expand from level 32' to a new level 33'. The water will then continue to rise until it spills over wall 13' and into discharge trough 59'. The water is then released from trough 59' into drain 66'. After a suitable backwash time period has elapsed, pump 52' will be turned on and normal filtering operations will resume.

An alternate embodiment of a filter for use with an automatic backwash system similar to that illustrated in FIG. 6 is depicted in FIG. 7. A filter 10" schematically depicted in FIG. 7 would be connected in a circuit similar to the circuit of FIG. 6 in which there is a balance tank, an influent pump and a discharge pump corresponding to pumps 50' and 52', respectively, of FIG. 6. However, the float 54' and its associated valve 63' are replaced with a different structure as will be seen in the description which follows. The influent pump would provide influent water to ports 21" and 70" while the effluent pump would draw water from effluent port 22". It should be noted at this point, however, that unlike filter 10' of FIG. 6, the walls of filter 10" of FIG. 7 are of equal height and there is only one trough associated with filter 10". This trough is a discharge trough 69". There is no influent trough associated with filter 10" since influent water enters an upper influent port 70" and flows directly into an influent pipe 68".

As illustrated in FIG. 7, filter 10" is basically of a similar shape and structure as filter 10 of FIG. 1. However, there are some structural differences which include the addition of a float operated influent valving system 71″, upper influent pipe 68″ having slots 74″, and upper influent port 70″.

Float operated influent valving system 71″ includes a float 72″, a stem 73″ connected to float 72″ and a curved sealing plate 76″. Curved sealing plate 76″ is connected to the other end of stem 73″ and is shaped to match the inside slots 74″ of pipe 68″. Float system 71″ is used to maintain the water level in filter 10″. As shown in FIGS. 7a and 7b, float system 71″ has the ability of rising or falling depending on the water level in filter 10″. As the water level gets low, float system 71″ will fall into pipe 68″ permitting a greater amount of water to enter through slots 74″. As the water level gets high, float system 71″ will rise causing curved sealing plate 76″ to eventually close slots 74″ in pipe 68″ thereby restricting the amount of water allowed to enter through slots 74″.

As previously mentioned, influent pipe 68″ has slots 74″ in its upper portion. One end of pipe 68″ extends in a sealed relationship through wall 12′ and discharge trough 69″ and connects to upper influent port 70″. The other end of pipe 68″ is terminated in a sealed relationship in a wall 13″ of filter 10″. During filtering operation, the influent water enters through influent port 70″ and into pipe 68″. It flows through slots 74″ and travels down towards effluent laterals 26″. As described with reference to filter 10 and filter 10′, influent water also enters influent conduit 18″ through port 21″ and is forced up towards effluent laterals 26″.

The water enters effluent laterals 26″ by flowing through well wire 36″ and into an inner influent pipe 38″ via perforations (not shown). The water then travels through pipe 38″ into an effluent conduit 24″ and then continues to travel through effluent conduit 24″ until it reaches a port 22″. From port 22″, the water is pumped to its intended place of use.

During backwash operation, effluent pump 52′ (not shown) is turned off thereby stopping port 22″. Again this could occur automatically by using a timer. However, water still enters through ports 70″ and 21″. The water entering port 70″ flows through pipe 68″ and out of slots 74″ into filter 10″. The water entering through port 21″ travels through conduit 18″ and enters influent laterals 28″. Since effluent is not being drawn through port 22″, the water in filter 10″ will rise causing curved sealing plate 76″ to close slots 74″. The water will then continue to rise overflowing into discharge trough 69″ and travelling to drain 66″.

The present invention, several embodiments of which have been described herein, includes a swimming pool bi-flow filter which is easier and more economical to construct than existing swimming pool filter structures. This is a result of constructing the filter in such a manner that the laterals, conduits and troughs inherently provide overall structural support. This configuration eliminates the need for structural members such as angle irons, thereby reducing cost. Also, the configuration of the subject filter of this invention permits the use of relatively thin and inexpensive stainless steel sheets to form the walls of the filter. Furthermore, by having the conduits and troughs surround the filter, there is no need to have conduits or troughs passing through the filter media, thus obstructing filtration flow.

Although preferred embodiments have been depicted and described in detail herein, it will be apparent to those skilled in the relevant art that various modifications, additions, substitutions and the like can be made without departing from the spirit of the invention, and these are therefore considered to be within the scope of the invention as defined in the appended claims.

What is claimed is:
1. A filter comprised of:
   a sealed enclosure having a bottom and upstanding side walls, each wall having an outside surface;
   a plurality of influent laterals arranged in a spaced-apart and parallel relationship with one another on a first plane near the bottom of said enclosure for receiving fluid to be filtered, each end of each influent lateral being mounted through a wall of said enclosure and sealed thereto;
   an influent conduit having a U-shaped cross-section mounted and sealed to the outside surface of one or more of the walls so that the ends of the influent laterals are in communication with the interior of said conduit, said influent conduit being structurally integral with the enclosure and having at least one opening through which influent water to be filtered may be received;
   a plurality of effluent laterals arranged in a spaced-apart and parallel relationship with one another on a second plane above and parallel to the first plane, each end of each effluent lateral being mounted through a side wall of said enclosure and sealed thereto;
   an effluent conduit having a U-shaped cross-section mounted and sealed to the outside surface of one or more said side walls so that the ends of the effluent laterals are in communication with the interior of said effluent conduit, said effluent conduit being structurally integral with the enclosure and having at least one opening through which filtered water may be discharged; and
   a filtering media substantially filling the space between the planes of the influent laterals and the effluent laterals.

2. The filter of claim 1, wherein each effluent lateral is comprised of a perforated pipe having a surrounding sleeve of well wire mounted thereon and spaced apart therefrom.

3. The filter of claim 1, wherein said influent laterals are perforated pipes.

4. A bi-flow filter for filtering fluids comprised of:
   a sealed enclosure having a bottom and upstanding side walls, each wall having an outside surface;
   a plurality of influent laterals arranged in a spaced-apart and parallel relationship with one another on a first plane near the bottom of said enclosure for receiving fluid to be filtered, each end of each influent lateral being mounted through a wall of said enclosure and sealed thereto;
   an influent conduit having a U-shaped cross-section mounted and sealed to the outside surface of one or more of the walls so that the ends of the influent laterals are in communication with the interior of said conduit, said influent conduit having at least one opening through which influent water to be filtered may be received;
   a plurality of effluent laterals arranged in a spaced-apart and parallel relationship with one another on a second plane, each end of each effluent lateral being mounted through a side wall of said enclosure and sealed thereto;
   an effluent conduit having a U-shaped cross-section mounted and sealed to the outside surface of one or more of said side walls so that the ends of the effluent laterals are in communication with the interior of said effluent conduit, said effluent conduit having at least one opening through which filtered water may be discharged;

an influent trough having an L-shaped cross-section with one leg being mounted and sealed to the outside of said walls on a third plane above said second plane and the other leg extending above one or more of said side walls so that fluid within the trough rising above the level of said one or more walls will spill over to the inside of said enclosure, said influent trough having at least one opening through which influent water to be filtered may be received and through which backwash water may be released; and a filtering media substantially filling the enclosure.

5. The filter of claim 4, wherein each effluent lateral is comprised of a perforated pipe having a surrounding sleeve of well wire mounted thereon and spaced apart therefrom.

6. The filter of claim 4, wherein said influent laterals are perforated pipes.

7. A bi-flow filter for filtering fluids comprised of:

a sealed enclosure having a bottom and upstanding side walls, said enclosure being partially filled with filtering media capable of containing fluid having a level;

lower influent means for introducing fluid to the filter near the bottom of the media;

effluent means for collecting filtered fluid at the mid-level of the media;

upper influent means for introducing fluid above the media;

means operatively connected to the upper influent means for terminating the flow of fluid therein in response to the fluid level rising to a first predetermined level above the media; and a discharge trough positioned to receive fluid from the fluid level rising above a second predetermined level above said first level.

8. The filter of claim 7 in combination with means for terminating the collection of fluid by the effluent means.

9. The filter of claim 7, wherein a first segment of the walls terminate with an upper edge at a first level and a second segment of the walls terminate with an upper edge at a second level which is below the first level and wherein the upper influent means comprises a influent trough mounted along the second segment of the walls so that fluid can spill therefrom over the second segment upper edge and into the filter enclosure and wherein the discharge trough is mounted along the first segment of the walls so that fluid can spill over the first segment upper edge and into the discharge trough, and wherein the troughs are configured so that they do not fluidly communicate with each other.

10. The filter of claim 7, wherein the upper influent means is comprised of an influent pipe having slots and wherein the terminating means is comprised of a float operated valve for closing said slots.

* * * * *